United States Patent
Yamazaki

(10) Patent No.: US 8,971,952 B2
(45) Date of Patent: *Mar. 3, 2015

(54) RADIO BASE STATION AND COMMUNICATION CONTROL METHOD

(75) Inventor: Chiharu Yamazaki, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 158 days.

This patent is subject to a terminal disclaimer.

(21) Appl. No.: 13/508,684

(22) PCT Filed: Nov. 9, 2010

(86) PCT No.: PCT/JP2010/069917
§ 371 (c)(1),
(2), (4) Date: May 8, 2012

(87) PCT Pub. No.: WO2011/055842
PCT Pub. Date: May 12, 2011

(65) Prior Publication Data
US 2012/0225688 A1 Sep. 6, 2012

(30) Foreign Application Priority Data
Nov. 9, 2009 (JP) .................... 2009-256484

(51) Int. Cl.
*H04B 7/00* (2006.01)
*H04W 52/24* (2009.01)
*H04L 5/00* (2006.01)
(Continued)

(52) U.S. Cl.
CPC ........... *H04W 52/243* (2013.01); *H04L 5/0035* (2013.01); *H04L 5/0062* (2013.01); *H04L 5/0073* (2013.01); *H04W 52/343* (2013.01);
(Continued)

(58) Field of Classification Search
CPC .............................. H04W 52/02; H04W 52/04
USPC ............ 455/69, 453, 500–528; 370/328–332, 370/338
See application file for complete search history.

(56) References Cited

U.S. PATENT DOCUMENTS

| | | | |
|---|---|---|---|
| 2002/0077111 A1* | 6/2002 | Spaling et al. | 455/453 |
| 2007/0207828 A1* | 9/2007 | Cheng et al. | 455/522 |
| 2010/0157934 A1* | 6/2010 | Tanno et al. | 370/330 |

FOREIGN PATENT DOCUMENTS

| | | |
|---|---|---|
| JP | 05-030022 | 2/1993 |
| JP | 2006-135673 A | 5/2006 |
| KR | 10-2007-0093996 A | 9/2007 |
| WO | 2008/139896 A1 | 11/2008 |

OTHER PUBLICATIONS

3GPP TSG-RAN WG1 Meeting #49, Ericsson, "On Inter-cell Interference Coordination Schemes without/with Traffic Load Indication", Japan, May 7-11, 2007, pp. 1-5.*

(Continued)

*Primary Examiner* — Nay A Maung
*Assistant Examiner* — Angelica M Perez
(74) *Attorney, Agent, or Firm* — Studebaker & Brackett PC

(57) ABSTRACT

A second radio base station (1B) receives, from a first radio base station (1A), both interference information for each of a plurality of resource blocks and a traffic amount ratio. Then, the second radio base station (1B) corrects, based on the received traffic amount ratio, the also received interference information for each resource block. Further, the second radio base station (1B) controls, based on the interference information as corrected for each resource block, the transmission power of a radio terminal (2B).

8 Claims, 4 Drawing Sheets

(51) Int. Cl.
  *H04W 52/34* (2009.01)
  *H04W 72/08* (2009.01)
  *H04W 52/14* (2009.01)

(52) U.S. Cl.
  CPC .......... *H04W 72/082* (2013.01); *H04W 52/143* (2013.01); *H04W 52/146* (2013.01)
  USPC ............................ 455/522; 455/453; 370/328

(56) References Cited

OTHER PUBLICATIONS

3GPP TSG-RAN WG3 #57; Ericsson, "X2 Support for Overload Indication and Traffic Load Indication", Greece, Aug. 20-24, 2007, pp. 1-5.*

An Office Action issued by the Korean Patent Office on Aug. 29, 2013, which corresponds to Korean Patent Application No. 2012-7012080 and is related to U.S. Appl. No. 13/508,684; with Concise Explanation.

3GPP TSG-RAN WG1 Meeting #49; Ericsson; On Inter-cell Interference Coordination Schemes without/with Traffic Load Indication; Kobe, Japan; May 7-11, 2007.

3GPP TSG-RAN WG3 #57; Ericsson; "X2 Support for Overload Indication and Traffic Load Indication"; Athens, Greece; Aug. 20-24, 2007.

International Search Report; PCT/JP2010/069917; Dec. 7, 2010.

S. Kuwahara; Japanese Office Action; Notification of Reason(s) for Refusal; JP2009-256484; Feb. 9, 2010.

S. Kuwahara; Japanese Office Action; Decision of Refusal; JP2009-256484; May 7, 2010.

* cited by examiner

RADIO BASE STATION AND COMMUNICATION CONTROL METHOD

TECHNICAL FIELD

The present invention relates to a radio base station configured to control interference received from a radio terminal connected to a different radio base station, and to a communication control method for the radio base station.

BACKGROUND ART

When radio communication in an uplink direction from a radio terminal to a connection destination radio base station is carried out in a radio communication system, interference caused by the radio terminal on a neighboring radio base station (a neighboring base station) is controlled (see Patent Document 1, for example).

The same applies to LTE (Long Term Evolution) which is a 3GPP standard. In the LTE, one radio base station is assumed to control interference received from a radio terminal connected to a neighboring radio base station (interference in the uplink direction from a neighboring cell) by exchanging information on an interference condition called OI (Overload Indicator) between the radio base stations.

Specifically, the one radio base station measures interference power in the uplink direction from the neighboring cell for each radio resource unit called a resource block (RB) and transmits ternary information indicating any of "small interference", "large interference", and "very large interference", for instance, to the neighboring radio base station depending on the interference power. The neighboring radio base station that receives the ternary information can control transmission power (transmission power in the uplink direction) of the connected radio terminal by use of the ternary information. For example, the neighboring radio base station controls the radio terminal upon receipt of the information indicating that the interference power is "very large" in such a manner as to lower the transmission power in the uplink direction, thereby reducing the interference power in the uplink direction on the one radio base station.

PRIOR ART DOCUMENT

Patent Document

Patent Document 1: Japanese Patent Application Publication No. Hei 5-30022

SUMMARY OF THE INVENTION

However, traffic does not always occur evenly in all base stations when a heterogeneous radio communication system in which a large number of base stations of different types are arranged, a microcell radio communication system, and the like are constructed in order to distribute radio communication loads, and there may conceivably be a situation where some base stations are involved in very small traffic. If such a base station involved in a very small amount of traffic transmits the OI only in accordance with the interference power in the uplink direction from the neighboring cell as described above, the neighboring radio base station may perform the control to reduce the transmission power in the uplink direction excessively. Thus there is a risk of causing reduction in channel capacity of the radio communication system as a whole.

Therefore, an objective of the present invention is to provide a radio base station and a communication control method, which are capable of preventing reduction in channel capacity of a radio communication system as a whole.

The present invention has the following features to solve the problems described above. First of all, a first feature of the present invention is summarized as follows. A radio base station (second radio base station 1B) configured to perform radio communications with a radio terminal (radio terminal 2B), comprises: a transmission power controller (radio terminal transmission power controller 162) configured to control transmission power of the radio terminal, wherein the transmission power controller controls the transmission power of the radio terminal based on interference information and load information, the interference information being information sent from a different radio base station (first radio base station 1A) and related to interference power received by the different radio base station, the load information being sent from the different radio base station and indicating a radio communication load in the different radio base station.

The above-described radio base station not only receives the interference information related to the interference power received by the different radio base station due to the radio terminal performing the radio communications with the radio base station but also receives the load information indicating the radio communication load in the different radio base station, and controls the transmission power of the radio terminal performing the radio communications with the radio base station based on the interference information and the load information. Specifically, the radio base station can control the transmission power of the radio terminal causing the interference with the different radio base station in consideration of the radio communication load in the different radio base station which is the sender of the interference information. Thus it is possible to prevent reduction in channel capacity of the radio communication system as a whole due to excessive reduction in the transmission power.

A second feature of the present invention is summarized as follows. The transmission power controller corrects the interference information such that the interference information indicates smaller interference power as the radio communication load indicated by the load information is smaller, and controls the transmission power of the radio terminal based on the corrected interference information.

A third feature of the present invention is summarized as follows. The transmission power controller corrects the interference information such that the interference information indicates lower interference power than actual interference power when a value representing the radio communication load indicated by the load information is equal to or below a predetermined threshold, and controls the transmission power of the radio terminal based on the corrected interference information.

A fourth feature of the present invention is summarized as follows. The interference information indicates interference power in a radio resource in a predetermined frequency band.

A fifth feature of the present invention is summarized as follows. The interference information indicates interference power for each minimum allocation unit in the radio resource allocated to a different radio terminal connected to the different radio base station.

A sixth feature of the present invention is summarized as follows. A radio base station (second radio base station 1B) configured to perform radio communications with a radio terminal (radio terminal 2B), comprises: a controller (radio terminal transmission power controller 162) configured to control interference with a different radio base station (first radio base station 1A) caused by the radio terminal, wherein the controller controls the interference with the different radio base station caused by the radio terminal based on interference information and load information, the interference information being information sent from the different radio base station and related to interference power received by the different radio base station, the load information being sent from the different radio base station and indicating a radio communication load in the different radio base station.

A seventh feature of the present invention is summarized as follows. A communication control method for a radio base station configured to perform radio communications with a radio terminal, comprises: controlling, at the radio base station, transmission power of the radio terminal based on interference information and load information, the interference information being information sent from a different radio base station and related to interference power received by the different radio base station, the load information being sent from the different radio base station and indicating a radio communication load in the different radio base station.

An eighth feature of the present invention is summarized as follows. A communication control method for a radio base station configured to perform radio communications with a radio terminal, comprises: controlling, at the radio base station, interference with a different radio base station caused by the radio terminal based on interference information and load information, the interference information being information sent from the different radio base station and related to interference power received by the other radio base station, the load information being sent from the other radio base station and indicating a radio communication load in the other radio base station.

According to the present invention, it is possible to prevent reduction in channel capacity of a radio communication system as a whole.

DESCRIPTION OF THE EMBODIMENT

Next, an embodiment of the present invention will be described with reference to the drawings. Specifically, description will be given of (1) Configuration of Radio Communication System, (2) Operations of Radio Base Stations, (3) Operations and Effects, and (4) Other Embodiments. In the following description of the drawings in conjunction with the embodiment, same or similar reference signs denote same or similar elements and portions.

Figure 1:
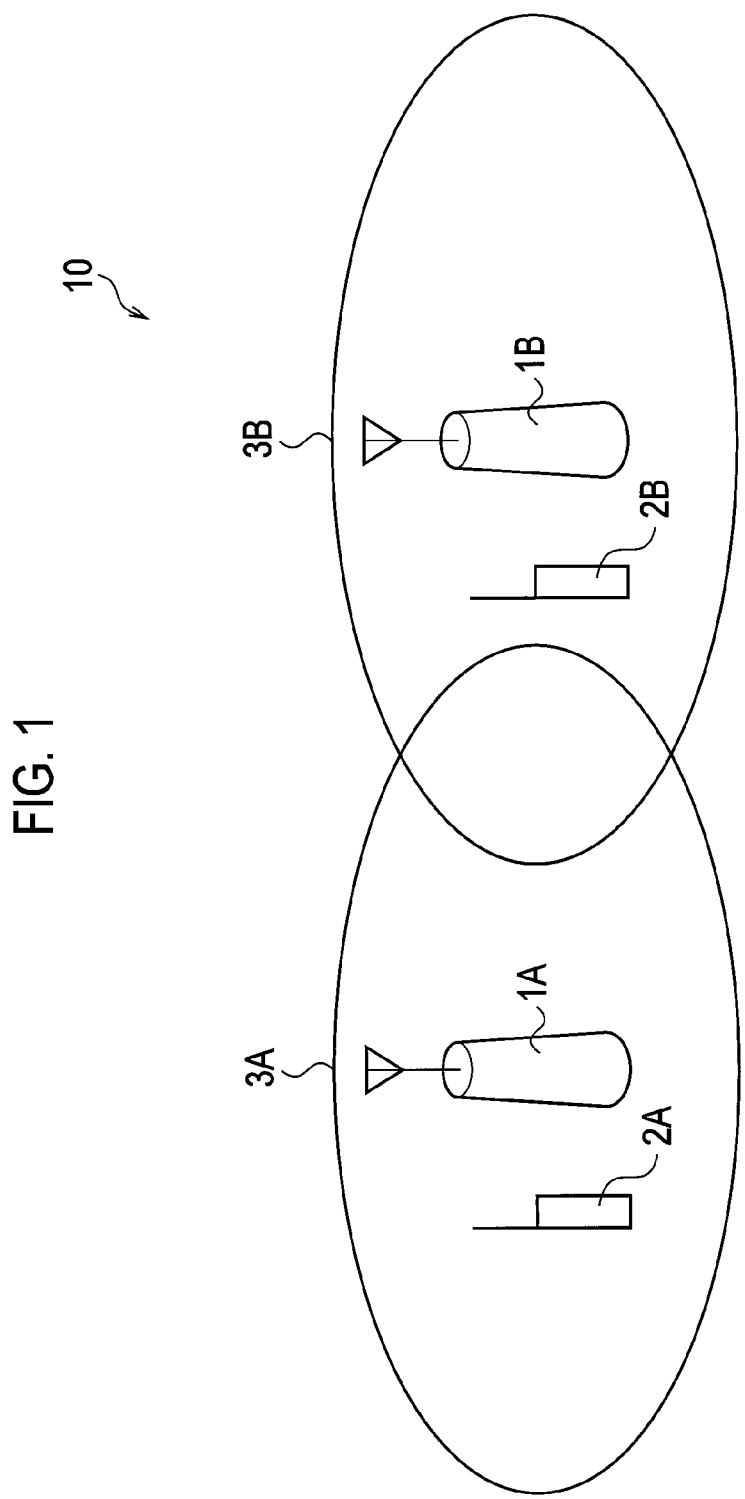
FIG. 1 is an overall schematic configuration diagram of a radio communication system according to an embodiment of the present invention.

(1) Configuration of Radio Communication System (1.1) Overall Schematic Configuration of Radio Communication System FIG. 1 is an overall schematic configuration diagram of a radio communication system 10 according to an embodiment of the present invention. The radio communication system 10 includes a configuration based on LTE Release9 which is a 3.9-generation (3.9G) mobile communications system or on LTE-Advanced which is positioned as a 4th generation (4G) mobile communications system, for example.

As shown in FIG. 1, the radio communication system 10 includes a first radio base station 1A which defines a cell 3A and a second radio base station 1B which defines a cell 3B. The cell 3B is a neighbor cell to the cell 3A. Each of the cell 3A and the cell 3B has a radius of several hundred [m], for example. A radio terminal 2A located in the cell 3A is connected to the first radio base station 1A while a radio terminal 2B located in the cell 3B is connected to the second ration base station 1B.

The first radio base station 1A and the second radio base station 1B are installed in positions based on station layout design formed by a common carrier in consideration of inter-cell interference.

The first radio base station 1A is connected to the second radio base station 1B by using an unillustrated dedicated line or the like to establish X2 connection which is a logical transmission path on a transport layer.

The first radio base station 1A allocates one or more resource blocks (RB) each in an uplink direction and in a downlink direction, which represent radio resources in minimum allocation units, to the radio terminal 2A and performs radio communications with the radio terminal 2A. Similarly, the second radio base station 1B allocates one or more resource blocks each in the uplink direction and in the downlink direction to the radio terminal 2B and performs radio communications with the radio terminal 2B.

In the case where a frequency band of the resource block corresponding to an uplink (which is a link directed from the radio terminal 2A to the first radio base station 1A and will be hereinafter referred to as a "first uplink") used for radio communications when the first radio base station 1A and the radio terminal 2A are connected to each other and performing the radio communications is the same as a frequency band of the resource block corresponding to an uplink (which is a link directed from the radio terminal 2B to the second radio base station 1B and will be hereinafter referred to as a "second uplink") used for radio communications when the second radio base station 1B and the radio terminal 2B are connected to each other and performing the radio communications, the first radio base station 1A performing the radio communications with the radio terminal 2A will be interfered with a radio signal transmitted from the radio terminal 2B to the second radio base station 1B by use of the second uplink.

As described previously, in this embodiment, the first radio base station 1A requests the second radio base station 1B to control transmission power of the radio terminal 2B when the first radio base station 1A receives the interference from the radio terminal 2B. The second radio base station 1B reduces the interference by controlling the transmission power of the radio terminal 2B in response to the request.

(1.2) Configuration of First Radio Base Station 1A

Figure 2:
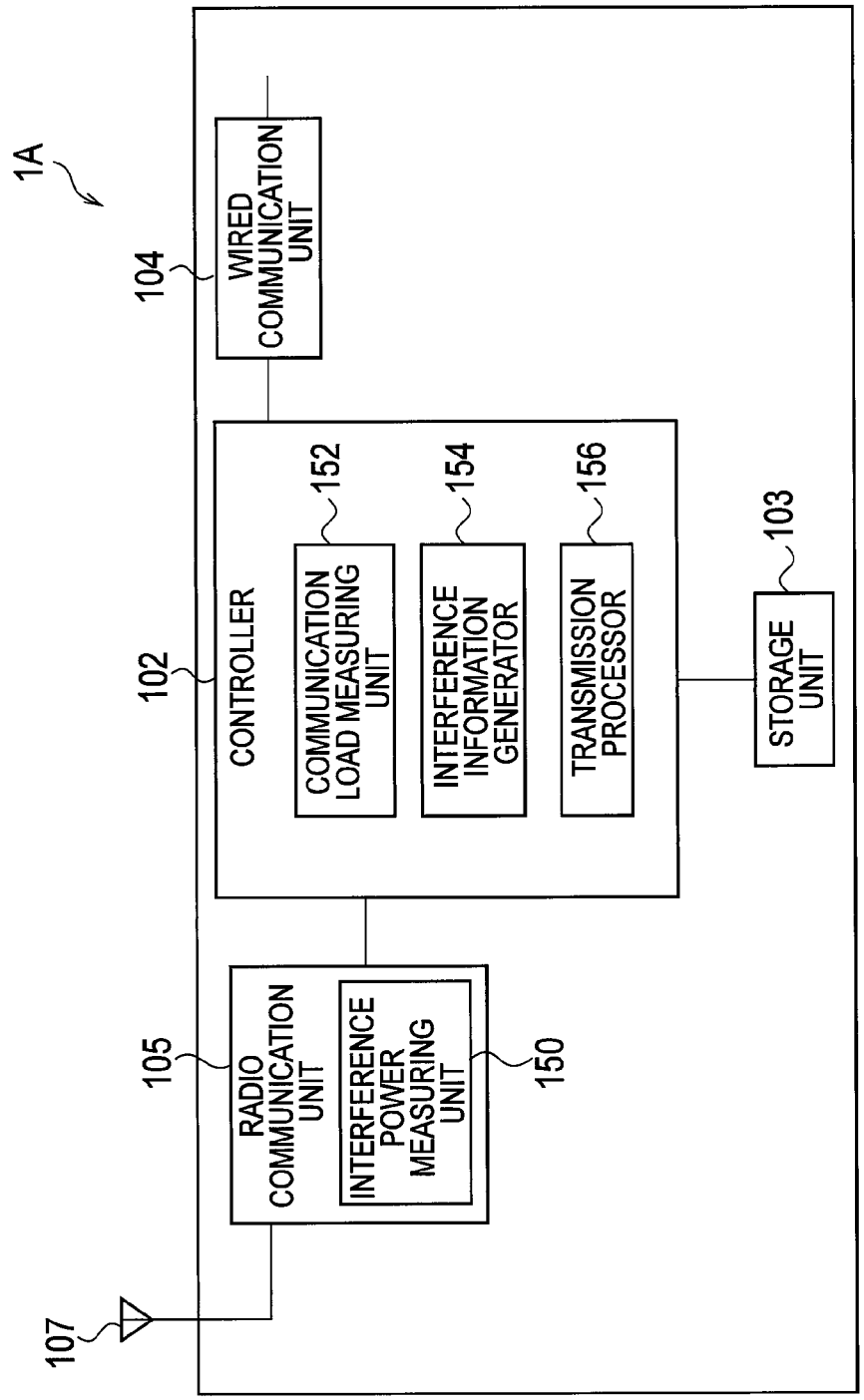
FIG. 2 is a configuration diagram of a first radio base station according to the embodiment of the present invention.

FIG. 2 is a block diagram showing a configuration of the first radio base station 1A. As shown in FIG. 2, the first radio base station 1A includes a controller 102, a storage unit 103, a wired communication unit 104, a radio communication unit 105, and an antenna unit 107.

The controller 102 is formed of a CPU, for example, and controls various functions included in the first radio base station 1A. The storage unit 103 is formed of a memory, for example, and stores a variety of information used for the control by the first radio base station 1A and the like.

The wired communication unit 104 performs transmission and reception of data to and from the second radio base station 1B. The radio communication unit 105 is formed by use of a radio frequency (RF) circuit or a baseband (BB) circuit, for example, and performs transmission and reception of radio signals to and from the radio terminal 2A through the antenna unit 107. Moreover, the radio communication unit 105 performs coding and modulation of transmitted signals as well as demodulation and decoding of received signals. Furthermore, the radio communication unit 105 outputs reception data acquired by demodulation and decoding of the received signals, to the controller 102.

The radio communication unit 105 includes an interference power measuring unit 150. The controller 102 includes a communication load measuring unit 152, an interference information generating unit 154, and a transmission processor 156.

The interference power measuring unit 150 in the radio communication unit 105 measures power of the interference received by way of a radio signal transmitted from the radio terminal 2B to the second radio base station 1B using the second uplink while a radio signal transmitted from the radio terminal 2A using the first uplink is received. Specifically, the interference power measuring unit 150 measures the power in terms of a component of the radio signal transmitted from the radio terminal 2B to the second radio base station 1B using the second uplink out of the received radio signals for each of one or more resource blocks allocated to the radio terminal 2A.

The communication load measuring unit 152 in the controller 102 calculates a ratio (a traffic amount ratio) of an actual traffic amount relative to a maximum processable traffic amount of the first radio base station 1A as a value indicating a radio communication load in the first radio base station 1A. Specifically, the communication load measuring unit 152 measures an amount of transmission data outputted from the controller 102 to the radio communication unit 105. Moreover, the communication load measuring unit 152 calculates the traffic amount ratio by dividing the amount of transmission data thus measured by a predetermined maximum processable traffic amount in the downlink direction. Alternatively, the communication load measuring unit 152 measures an amount of reception data outputted from the radio communication unit 105 to the controller 102. Moreover, the communication load measuring unit 152 calculates the traffic amount ratio by dividing the amount of reception data thus measured by a predetermined maximum processable traffic amount in the uplink direction.

The maximum processable traffic amount in the downlink direction and the maximum processable traffic amount in the uplink direction are stored in the storage unit 103. In addition, the communication load measuring unit 152 may perform correction in such a manner as to increase the calculated traffic amount ratio along with an increase in the required throughput and the required amount of data in the radio communications between the first radio base station 1A and the radio terminal 2A.

The interference information generating unit 154 in the controller 102 generates interference information on each of the resource blocks as an OI (Overload Indicator) based on an interference power value for each of the resource blocks measured by the interference power measuring unit 150. Specifically, the interference information generating unit 154 increases the value of the interference information on each of the resource blocks as the interference power value of the corresponding resource block is greater.

The transmission processor 156 in the controller 102 extracts identification information on the radio terminal 2B being the sender of the radio signal as well as identification information on the second radio base station 1B being the destination included in reception data corresponding to the radio signal transmitted from the radio terminal 2B to the second radio base station 1B using the second uplink. Next, the transmission processor 156 provides the interference information on each of the resource blocks generated by the interference information generating unit 154 with identification information on the resource block corresponding to the interference information and with the extracted identification information on the radio terminal 2B. Moreover, the transmission processor 156 sets the destination of the interference information on each of the resource blocks and the information (load information) indicating the traffic amount ratio calculated by the communication load measuring unit 152 to the extracted identification information on the second radio base station 1B, and transmits the interference information and the information indicating the traffic amount ratio to the second radio base station 1B through the wired communication unit 104.

(1.3) Configuration of Second Radio Base Station 1B

Figure 3:
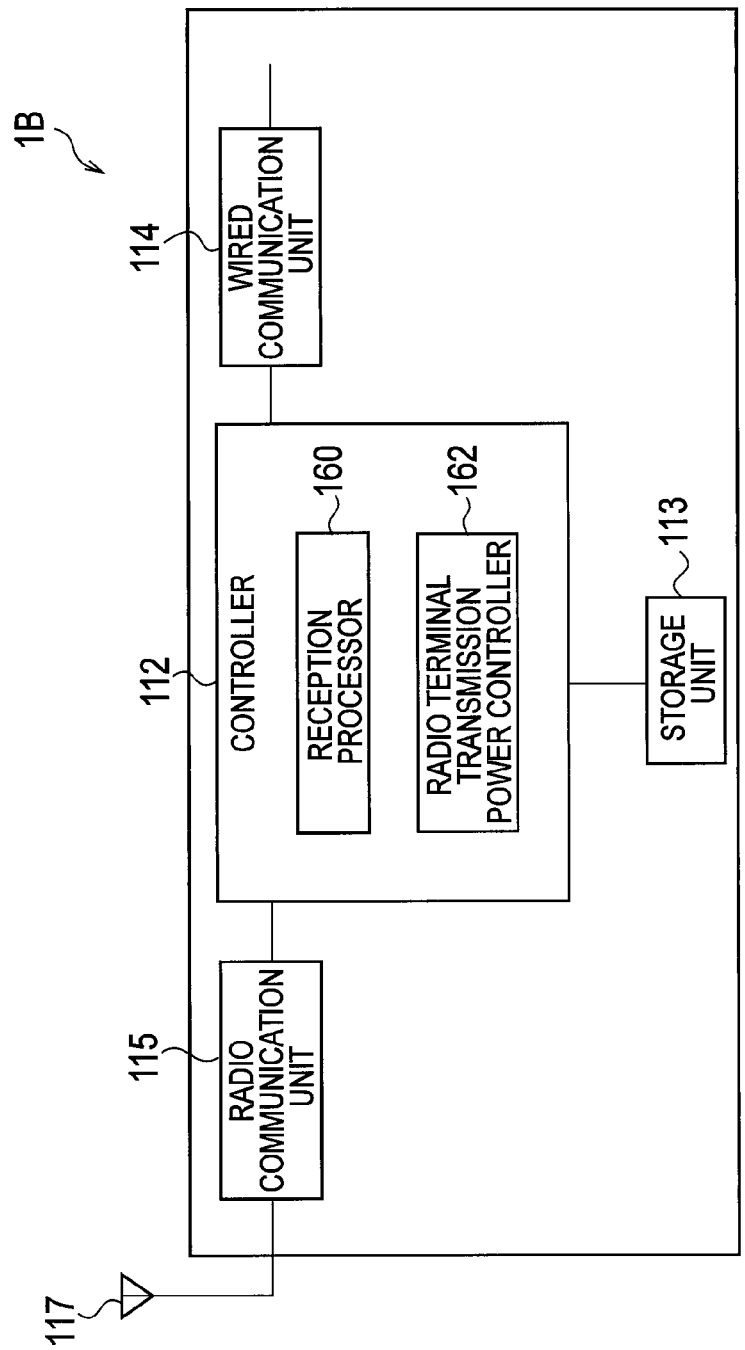
FIG. 3 is a configuration diagram of a second radio base station according to the embodiment of the present invention.

FIG. 3 is a block diagram showing a configuration of the second radio base station 1B. As shown in FIG. 3, the second radio base station 1B includes a controller 112, a storage unit 113, a wired communication unit 114, a radio communication unit 115, and an antenna unit 117.

The controller 112 is formed of a CPU, for example, and controls various functions included in the second radio base station 1B. The storage unit 113 is formed of a memory, for example, and stores a variety of information used for the control by the second radio base station 1B and the like.

The wired communication unit 114 performs transmission and reception of the data to and from the first radio base station 1A. The radio communication unit 115 is formed by use of a radio frequency (RF) circuit or a baseband (BB) circuit, for example, and performs transmission and reception of radio signals to and from the radio terminal 2B through the antenna unit 117. Moreover, the radio communication unit 115 performs coding and modulation of transmitted signals as well as demodulation and decoding of received signals. Furthermore, the radio communication unit 115 outputs reception data acquired by demodulation and decoding of the received signals, to the controller 112.

The controller 112 includes a reception processor 160 and a radio terminal transmission power controller 162.

The reception processor 160 in the controller 112 receives the interference information on each of the resource blocks and information indicating the traffic amount ratio from the first radio base station 1A through the wired communication unit 114.

The radio terminal transmission power controller 162 in the controller 112 corrects the interference information on each of the resource blocks received by the reception processor 160 based on the information indicating the traffic amount ratio received by the reception processor 160.

Specifically, the radio terminal transmission power controller 162 corrects the value of the interference information on each of the resource blocks with a value smaller by 1 when the traffic amount ratio is equal to or above a first threshold.

Moreover, the radio terminal transmission power controller 162 controls the transmission power of the radio terminal 2B based on the interference information (or the corrected interference information when the correction is applicable)

on each of the resource blocks. Specifically, the radio terminal transmission power controller 162 determines the radio terminal 2B subject to control of the transmission power based on the identification information on the radio terminal 2B attached to each piece of the interference information on each of the resource blocks received by the reception processor 160. Next, the radio terminal transmission power controller 162 generates a transmission power reduction request including the identification information on the resource block attached to the interference information and requesting for a larger reduction ratio of the transmission power as the value of the interference information is greater.

In addition, the radio terminal transmission power controller 162 transmits the generated transmission power reduction request to the radio terminal 2B through the radio communication unit 115 and the antenna unit 117. Upon receipt of this transmission power reduction request, the radio terminal 2B reduces the transmission power for the resource block corresponding to the identification information on the resource block which is attached to the transmission power reduction request.

Figure 4:
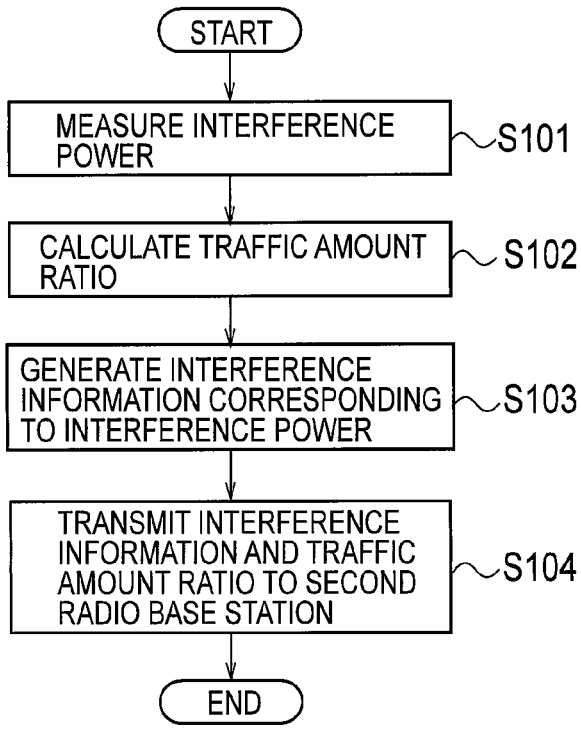
FIG. 4 is a flowchart showing operations of the first radio base station according to the embodiment of the present invention.

(2) Operations of Radio Base Stations (2.1) Operations of First Radio Base Station 1A FIG. 4 is a flowchart showing operations of the first radio base station 1A. In step S101, the interference power measuring unit 150 in the radio communication unit 105 measures the power of the interference received by way of the radio signal transmitted from the radio terminal 2B to the second radio base station 1B using the second uplink while the radio signal transmitted from the radio terminal 2A using the first uplink is received for each of the resource blocks allocated to the radio terminal 2A.

In step S102, the communication load measuring unit 152 in the controller 102 calculates the ratio (the traffic amount ratio) of the actual traffic amount relative to the maximum processable traffic amount of the first radio base station 1A.

In step S103, the interference information generating unit 154 in the controller 102 generates the interference information on each of the resource blocks corresponding to the interference power value for each of the resource blocks.

In step S104, the transmission processor 156 in the controller 102 transmits the interference information on each of the resource blocks and the information (the load information) indicating the traffic amount ratio to the second radio base station 1B.

(2.2) Operations of Second Radio Base Station 1B

Figure 5:
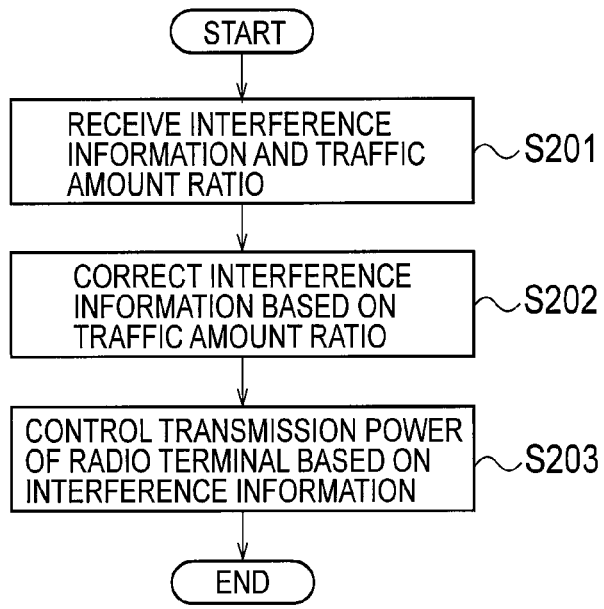
FIG. 5 is a flowchart showing operations of the second radio base station according to the embodiment of the present invention.

FIG. 5 is a flowchart showing operations of the second radio base station 1B. In step S201, the reception processor 160 in the controller 112 receives the interference information on each of the resource blocks and the information indicating the traffic amount ratio from the first radio base station 1A.

In step S202, the radio terminal transmission power controller 162 in the controller 112 corrects the received interference information on each of the resource blocks based on the similarly received information indicating the traffic amount ratio.

In step S203, the radio terminal transmission power controller 162 in the controller 112 controls the transmission power of the radio terminal 2B based on the interference information (or the corrected interference information when the correction is applicable).

(3) Operations and Effects

According to the radio communication system 10 of this embodiment, the first radio base station 1A measures the power of the interference received by way of the radio signal transmitted from the radio terminal 2B to the second radio base station 1B using the second uplink for each of one or more resource blocks allocated to the radio terminal 2A, and calculates the traffic amount ratio of the first radio base station 1A. Moreover, the first radio base station 1A generates the interference information on each of the resource blocks corresponding to the interference power value for each of the resource blocks, and transmits the interference information on each of the resource blocks and the information indicating the traffic amount ratio measured by the communication load measuring unit 152 to the second radio base station 1B.

Meanwhile, according to the radio communication system 10 of this embodiment, the second radio base station 1B receives the interference information on each of the resource blocks and the information indicating the traffic amount ratio from the first radio base station 1A. Next, the second radio base station 1B corrects the received interference information on each of the resource blocks based on the similarly received traffic amount ratio. Furthermore, the second radio base station 1B controls the transmission power of the radio terminal 2B based on the corrected interference information on each of the resource blocks.

When the radio communication load in the first radio base station 1A is small, it is possible to prevent the interference for instance by changing the resource block to be allocated to the radio terminal 2A instead of reducing the transmission power of the radio terminal 2B which is the generation source of the interference. Accordingly, the transmission power of the radio terminal 2B is controlled under the condition where not only the power of the interference at the first radio base station 1A but also the radio communication load in the first radio base station 1A are taken into account. Hence it is possible to prevent reduction in channel capacity of the radio communication system 10 as a whole due to excessive reduction in the transmission power of the radio terminal 2B.

(4) Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

In the above-described embodiment, the value of the interference information on each of the resource blocks is increased as the interference power value of the corresponding resource block is greater. Instead, the interference information may be binary information including any of "1" indicating large interference and "0" indicating small interference. In this case, in terms of the interference power value for each of the resource blocks, the interference information generating unit 154 in the controller 102 of the first radio base station 1A generates "1" indicating that the interference is large as the interference information when the interference power value is equal to or above a second threshold or generates "0" indicating that the interference is small as the interference information when the interference power value is below the first threshold.

In the meantime, the radio terminal transmission power controller 162 in the controller 112 of the second radio base station 1B corrects the value of the interference information with "0" when the traffic amount ratio is equal to or above the first threshold and the interference information is equal to "1". Further, the radio terminal transmission power controller 162 generates the transmission power reduction request when the value of the interference information is equal to "1", and transmits the request to the radio terminal 2B.

Alternatively, the interference information may include ternary or more values defined such that a larger value represents a larger interference power value. In this case, the radio terminal transmission power controller 162 in the controller 112 of the second radio base station 1B decrements the value of the interference information by 1 when the traffic amount ratio is equal to or above the first threshold and the interference information is equal to or above "1". Further, the radio terminal transmission power controller 162 generates the transmission power reduction request that requests for a larger reduction ratio of the transmission power as the value of the interference information is greater, and transmits the request to the radio terminal 2B.

Meanwhile, according to the above-described embodiment, the first radio base station 1A measures the interference power and further generates and transmits the interference information for each of the resource blocks. Instead, it is also possible to calculate an average value of the interference power of all the resource blocks allocated to the radio terminal 2A and to generate and transmit a single piece of the interference information corresponding to the average value of the interference power. In this case, the second radio base station 1B controls the transmission power of the radio terminal 2B based on the single piece of the interference information, or in other words, on the interference information corresponding to all the resource blocks allocated to the radio terminal 2A.

In the meantime, the radio communication load is not limited to the traffic amount ratio at the first radio base station 1A. The radio communication load may also be a usage rate of the resource blocks at the first radio base station 1A, the bare traffic amount itself at the first radio base station 1A, a processing load associated with the radio communication by the first radio base station 1A, and so forth.

Moreover, in the above-described embodiment, the radio communication system 10 has the configuration based on LTE Release9 or LTE-Advanced. However, the system may have a configuration based on any other communication standards.

As described above, the present invention naturally includes various embodiments which are not described herein. Accordingly, the technical scope of the present invention should be determined only by the matters to define the invention in the scope of claims regarded as appropriate based on the description.

The entire contents of Japanese Patent Application No. 2009-256484 (filed on Nov. 9, 2009) are herein incorporated by reference.

INDUSTRIAL APPLICABILITY

The radio base station and the communication control method of the present invention can prevent reduction in channel capacity of a radio communication system as a whole, and are w therefore useful as a radio base station and a communication control method.

The invention claimed is:

1. A radio base station configured to perform radio communications with a radio terminal, comprising:
   a transmission power controller configured to control transmission power of the radio terminal, wherein
   the transmission power controller controls the transmission power of the radio terminal based on interference information and load information, the interference information being information sent from a different radio base station and related to interference power received by the different radio base station, the load information being sent from the different radio base station and indicating a radio communication load in the different radio base station,
   the transmission power controller corrects a value representing the interference power indicated by the interference information based on a value representing the radio communication load indicated by the load information, and controls the transmission power of the radio terminal based on the corrected value of the interference information;
   wherein the transmission power controller corrects the interference information such that the interference information indicates smaller interference power as the radio communication load indicated by the load information is smaller, and controls the transmission power of the radio terminal based on the corrected interference information, and
   wherein the transmission power controller corrects the interference information such that the interference information indicates lower interference power than actual interference power when a value representing the radio communication load indicated by the load information is equal to or below a predetermined threshold, and controls the transmission power of the radio terminal based on the corrected interference information.

2. The radio base station according to claim 1, wherein the transmission power controller corrects the interference information such that the interference information indicates smaller interference power as the radio communication load indicated by the load information is smaller, and controls the transmission power of the radio terminal based on the corrected interference information.

3. A radio base station configured to perform radio communications with a radio terminal, comprising:
   a transmission power controller configured to control transmission power of the radio terminal, wherein
   the transmission power controller controls the transmission power of the radio terminal based on interference information and load information, the interference information being information sent from a different radio base station and related to interference power received by the different radio base station, the load information being sent from the different radio base station and indicating a radio communication load in the different radio base station,
   wherein the transmission power controller corrects the interference information such that the interference information indicates smaller interference power as the radio communication load indicated by the load information is smaller, and controls the transmission power of the radio terminal based on the corrected interference information, and
   wherein the transmission power controller corrects the interference information such that the interference information indicates lower interference power than actual interference power when a value representing the radio communication load indicated by the load information is equal to or below a predetermined threshold, and controls the transmission power of the radio terminal based on the corrected interference information.

4. The radio base station according to claim 1, wherein the interference information indicates interference power in a radio resource in a predetermined frequency band.

5. The radio base station according to claim 4, wherein the interference information indicates interference power for each minimum allocation unit in the radio resource allocated to a different radio terminal connected to the different radio base station.

6. A radio base station configured to perform radio communications with a radio terminal, comprising:
a controller configured to control interference with a different radio base station caused by the radio terminal, wherein
the controller controls the interference with the different radio base station caused by the radio terminal based on interference information and load information, the interference information being information sent from the different radio base station and related to interference power received by the different radio base station, the load information being sent from the different radio base station and indicating a radio communication load in the different radio base station,
the controller corrects a value representing the interference power indicated by the interference information based on a value representing the radio communication load indicated by the load information, and controls the interference with the different radio base station caused by the radio terminal based on the corrected value of the interference information;
wherein the controller corrects the interference information such that the interference information indicates smaller interference power as the radio communication load indicated by the load information is smaller, and controls the transmission power of the radio terminal based on the corrected interference information, and
wherein the controller corrects the interference information such that the interference information indicates lower interference power than actual interference power when a value representing the radio communication load indicated by the load information is equal to or below a predetermined threshold, and controls the transmission power of the radio terminal based on the corrected interference information.

7. A communication control method for a radio base station configured to perform radio communications with a radio terminal, comprising:
controlling, at the radio base station, transmission power of the radio terminal based on interference information and load information, the interference information being information sent from a different radio base station and related to interference power received by the different radio base station, the load information being sent from the different radio base station and indicating a radio communication load in the different radio base station,
correcting a value representing the interference power indicated by the interference information based on a value representing the radio communication load indicated by the load information such that the interference information indicates smaller interference power as the radio communication load indicated by the load information is smaller, and controls the transmission power of the radio terminal based on the corrected interference information, and
correcting the interference information such that the interference information indicates lower interference power than actual interference power when a value representing the radio communication load indicated by the load information is equal to or below a predetermined threshold, and controls the transmission power of the radio terminal based on the corrected interference information.

8. A communication control method for a radio base station configured to perform radio communications with a radio terminal, comprising:
controlling, at the radio base station, interference with a different radio base station caused by the radio terminal based on interference information and load information, the interference information being information sent from the different radio base station and related to interference power received by the other radio base station, the load information being sent from the other radio base station and indicating a radio communication load in the other radio base station,
correcting a value representing the interference power indicated by the interference information based on a value representing the radio communication load indicated by the load information,
controlling the interference with the different radio base station caused by the radio terminal based on the corrected value of the interference information;
correcting the interference information such that the interference information indicates smaller interference power as the radio communication load indicated by the load information is smaller, and controlling the transmission power of the radio terminal based on the corrected interference information, and
wherein the transmission power controller corrects the interference information such that the interference information indicates lower interference power than actual interference power when a value representing the radio communication load indicated by the load information is equal to or below a predetermined threshold, and controlling the transmission power of the radio terminal based on the corrected interference information.

* * * * *